United States Patent
Suzuki et al.

(10) Patent No.: US 7,157,405 B2
(45) Date of Patent: Jan. 2, 2007

(54) DEVICE FOR CLARIFYING EXHAUST GAS FROM INTERNAL COMBUSTION ENGINE

(75) Inventors: Norihiko Suzuki, Wako (JP); Hideki Uedahira, Wako (JP); Hiroshi Oono, Wako (JP); Shinichi Kikuchi, Wako (JP); Masahiro Sakanushi, Wako (JP); Ryoko Yamada, Wako (JP); Yoshiaki Matsuzono, Wako (JP)

(73) Assignee: Honda Giken Kogyo Kabushiki Kabushiki Kaisha, Tokyo (JP)

( * ) Notice: Subject to any disclaimer, the term of this patent is extended or adjusted under 35 U.S.C. 154(b) by 177 days.

(21) Appl. No.: 10/362,967

(22) PCT Filed: Aug. 24, 2001

(86) PCT No.: PCT/JP01/07279

§ 371 (c)(1),
(2), (4) Date: Aug. 20, 2003

(87) PCT Pub. No.: WO02/20140

PCT Pub. Date: Mar. 14, 2002

(65) Prior Publication Data

US 2004/0038814 A1  Feb. 26, 2004

(30) Foreign Application Priority Data

Sep. 7, 2000  (JP)  .............................. 2000-271401
Apr. 4, 2001  (JP)  .............................. 2001-106327

(51) Int. Cl.
  *B01J 23/40*  (2006.01)
  *B01J 23/00*  (2006.01)

(52) U.S. Cl. ...................................... 502/339; 502/303

(58) Field of Classification Search ................ 502/302, 502/303, 304, 326, 339, 525; 422/177
See application file for complete search history.

(56) References Cited

U.S. PATENT DOCUMENTS 4,849,398 A * 7/1989 Takada et al. .............. 502/303

(Continued)

FOREIGN PATENT DOCUMENTS

JP  60-1342  1/1985

(Continued)

*Primary Examiner*—Cam N. Nguyen
(74) *Attorney, Agent, or Firm*—Armstrong, Kratz, Quintos, Hanson & Brooks, LLP

(57) ABSTRACT

An exhaust emission control system for an internal combustion engine is provided. The exhaust emission control system (4) includes a monolith catalyst (MC) that includes an oxygen storage agent and a noble metal-based three-way catalyst including Pd, Rh, and Pt disposed at an upstream location in the exhaust gas flow in the internal combustion engine (2), and a perovskite-type double oxide having a three-way catalytic function disposed at a downstream location in the exhaust gas flow. The amount C1 of Pd carried is $0.97 \text{ g/L} \leq C1 \leq 1.68 \text{ g/L}$, the amount C2 of Rh carried is $0.11 \text{ g/L} \leq C2 \leq 0.2 \text{ g/L}$, the amount C3 of Pt carried is $0.06 \text{ g/L} \leq C3 \leq 0.11 \text{ g/L}$, the amount C4 of the oxygen storage agent carried is $25 \text{ g/L} \leq C4 \leq 75 \text{ g/L}$, and the amount C5 of the perovskite-type double oxide carried is $5 \text{ g/L} \leq C5 \leq 15 \text{ g/L}$. It is thereby possible to provide an exhaust emission control system that can reduce the production cost by reducing the amount of noble metal-based three-way catalyst used and at the same time can maintain a high exhaust emission control rate.

4 Claims, 9 Drawing Sheets

U.S. PATENT DOCUMENTS

| | | | |
|---|---|---|---|
| 5,866,078 A | | 2/1999 | Pfefferle et al. |
| 5,977,017 A | * | 11/1999 | Golden ................. 502/302 |
| 5,990,038 A | * | 11/1999 | Suga et al. ............. 502/303 |
| 6,087,298 A | * | 7/2000 | Sung et al. ............. 502/333 |
| 6,217,831 B1 | * | 4/2001 | Suzuki et al. ........... 422/177 |
| 6,352,955 B1 | * | 3/2002 | Golden ................. 502/302 |
| 6,372,686 B1 | * | 4/2002 | Golden ................. 502/302 |
| 6,375,910 B1 | * | 4/2002 | Deeba et al. ........... 423/239.1 |
| 6,395,675 B1 | * | 5/2002 | Suga et al. ............. 502/326 |
| 6,497,851 B1 | * | 12/2002 | Hu et al. .............. 423/213.5 |
| 6,517,785 B1 | * | 2/2003 | Noda et al. ............ 422/180 |
| 6,531,425 B1 | * | 3/2003 | Golden ................. 502/302 |
| 6,634,168 B1 | * | 10/2003 | Yamamoto ............. 60/285 |
| 6,841,511 B1 | * | 1/2005 | Kaneeda et al. ......... 502/330 |

FOREIGN PATENT DOCUMENTS

| | | |
|---|---|---|
| JP | 63-267805 | 11/1988 |
| JP | 3-94818 | 4/1991 |
| WO | WO 97/37760 | 10/1997 |

* cited by examiner

DEVICE FOR CLARIFYING EXHAUST GAS FROM INTERNAL COMBUSTION ENGINE

FIELD OF THE INVENTION

The present invention relates to an exhaust emission control system for an internal combustion engine.

BACKGROUND ART

There is a conventionally known exhaust emission control system used for an exhaust system of an internal combustion engine in which an air/fuel mixture is controlled to have a theoretical air-fuel ratio, the exhaust emission control system employing a three-way catalyst comprising noble metals such as Pt, Rh, and Pd, that is, a noble metal-based three-way catalyst.

In the noble metal-based three-way catalyst, a range of air-fuel ratio enabling a high exhaust emission control rate to be obtained, namely, an A/F window is wide. Therefore, an exhaust emission control system using a noble metal-based three-way catalyst has an advantage that the control of an air-fuel ratio for increasing the exhaust emission control rate is relatively easy to carry out. However, the exhaust emission control system suffers from a problem that the manufacture cost is high due to the use of the noble metal-based three-way catalyst.

DISCLOSURE OF THE INVENTION

Accordingly, it is an object of the present invention to provide an exhaust emission control system of the above-described type, wherein the amount of noble metal-based three-way catalyst used can be decreased to provide a reduction in manufacture cost, and the exhaust emission control rate can be maintained high.

To achieve the above object, in accordance with the present invention, there is provided an exhaust emission control system for an internal combustion engine, the system comprising a monolith catalyst that includes an oxygen storage agent and a noble metal-based three-way catalyst comprising Pd, Rh, and Pt disposed at an upstream location in the exhaust gas flow in the internal combustion engine, and a perovskite-type double oxide having a three-way catalytic function disposed at a downstream location in the exhaust gas flow, the amount C1 of Pd carried being 0.97 g/L$\leq$C1$\leq$1.68 g/L, the amount C2 of Rh carried being 0.11 g/L$\leq$C2$\leq$0.2 g/L, the amount C3 of Pt carried being 0.06 g/L$\leq$C3$\leq$0.11 g/L, the amount C4 of the oxygen storage agent carried being 25 g/L$\leq$C4$\leq$75 g/L, and the amount C5 of the perovskite-type double oxide carried being 5 g/L$\leq$C5$\leq$15 g/L.

The three-way catalytic function of the perovskite-type double oxide is substantially identical to that of the noble metal-based three-way catalyst comprising Pd, Rh and Pt. Combining the noble metal-based three-way catalyst with the perovskite-type double oxide can reduce the amount of expensive noble metal-based three-way catalyst used, thereby reducing the production cost of the exhaust emission control system.

When the air-fuel ratio of exhaust gas from the internal combustion engine is controlled at a theoretical air-fuel ratio, although the air-fuel ratio of the exhaust gas at the inlet of a purification region that includes the noble metal-based three-way catalyst has a relatively large variation due to various external factors and the like, since the noble metal-based three-way catalyst has a wide A/F Window, in spite of the variation it can exhibit an exhaust emission control capability. At the same time, the oxygen storage agent exhibits an oxygen storage effect, and the air-fuel ratio of the exhaust gas at the outlet of the purification region is therefore made to converge to a substantially straight line so as to minimize the variation (A/F stabilization effect).

Although the A/F Window of the perovskite-type double oxide is significantly narrower than that of the noble metal-based three-way catalyst, the convergence of the air-fuel ratio of the exhaust gas by the oxygen storage agent can make the air-fuel ratio of the exhaust gas fall within the narrow A/F Window, and the perovskite-type double oxide can thereby exhibit an excellent exhaust emission control capability.

The perovskite-type double oxide having the three-way catalytic function has A-site defects in its crystal structure, and it is conceivable that the A-site defects are involved in purification of the exhaust gas. That is, NOx in the exhaust gas is adsorbed on the A-site defects, the O atom thereof enters the A-site defect, the bonding state of the NOx thereby becomes electronically unstable, and the bond between the O atom and the N atom is broken. The N atom is reduced to become $N_2$, and the O atom remaining in the A-site defect adsorbs HC, CO, and $H_2$ in the exhaust gas and leaves the A-site defect, thus regenerating the A-site defect and at the same time oxidizing the HC, CO, and $H_2$ into $H_2O$ and $CO_2$.

Pd, Rh, and Pt can exhibit an exhaust emission control capability even in a state in which the exhaust gas temperature is low when the internal combustion engine is started and the perovskite-type double oxide is not yet activated. Furthermore, when the exhaust gas flow rate is high (high SV), the perovskite-type double oxide tends to have a low NOx control capability, but this can be compensated for by Rh and Pt.

However, when the amounts C1 to C3 of the Pd, Rh, and Pt carried are C1<0.97 g/L, C2<0.11 g/L, and C3<0.06 g/L, the above-mentioned exhaust emission control effect cannot be obtained, and when the amounts C1 to C3 of the Pd, Rh, and Pt carried are C1>1.68 g/L, C2>0.2 g/L, and C3>0.11 g/L, although the exhaust emission control effect is hardly changed, a large amount of Pd, etc. is used and the desired object cannot be attained.

When the amount C4 of the oxygen storage agent carried is C4<25 g/L, the above-mentioned stabilization effect cannot be obtained, and when C4 is more than 75 g/L, the effect is not changed. The amount C4 of the oxygen storage agent carried is preferably 35 g/L$\leq$C4$\leq$65 g/L.

When the amount C5 of the perovskite-type double oxide carried is C5<5 g/L, there is no effect therefrom, and when C5 is more than 15 g/L, there is a possibility that the flow of exhaust gas might be disrupted. The amount C5 of the perovskite-type double oxide carried is preferably 7 g/L$\leq$C5$\leq$14 g/L.

It is economical to use a perovskite-type double oxide containing a lanthanoid mixture extracted from bastnaesite which is an ore. The reason is as follows: Many steps are required to extract a lanthanoid from the bastnaesite, resulting in an increased production cost of the lanthanoid, but a lanthanoid mixture is produced through a smaller number of steps, as compared with the number of steps for producing a lanthanoid, and hence, the production cost of the lanthanoid mixture is remarkably lower than that of the lanthanoid.

In accordance with the present invention, there is also provided an exhaust emission control system for an internal combustion engine, the system comprising a monolith catalyst that includes a noble metal-based three-way catalyst disposed at an upstream location in the exhaust gas flow in the internal combustion engine, and a perovskite-type double oxide having three-way catalytic function disposed at a downstream location in the exhaust gas flow, wherein an oxygen storage agent is disposed together with the noble metal-based three-way catalyst, and the amount C4 of the oxygen storage agent carried is 25 g/L$\leq$C4$\leq$75 g/L.

When the air-fuel ratio of the exhaust gas from the internal combustion engine is controlled so as to become equal to a theoretical air-fuel ratio, although the air-fuel ratio of the exhaust gas at the inlet of a purification region that includes the noble metal-based three-way catalyst has a relatively large variation due to various external factors and the like, since the noble metal-based three-way catalyst has a wide A/F window, in spite of the variation it can exhibit an excellent exhaust emission control capability. When the oxygen storage agent is disposed together with the noble metal-based three-way catalyst, since the oxygen storage agent exhibits an oxygen storage effect, the air-fuel ratio of the exhaust gas at the outlet of the purification region is made to converge to a substantially straight line so as to minimize the variation (A/F stabilization effect).

Although the A/F Window of the perovskite-type double oxide is significantly narrower than that of the noble metal-based three-way catalyst, the convergence of the air-fuel ratio of the exhaust gas by the oxygen storage agent can make the air-fuel ratio of the exhaust gas fall within the narrow A/F Window, and the perovskite-type double oxide can thereby exhibit an excellent exhaust emission control capability.

However, when the amount C4 of the oxygen storage agent carried is C4<25 g/L, the above-mentioned stabilization effect cannot be obtained, and when C4 is more than 75 g/L, the effect is not changed. The amount C4 of the oxygen storage agent carried is preferably 35 g/L$\leq$C4$\leq$65 g/L.

BEST MODE FOR CARRYING OUT THE INVENTION

Figure 1:
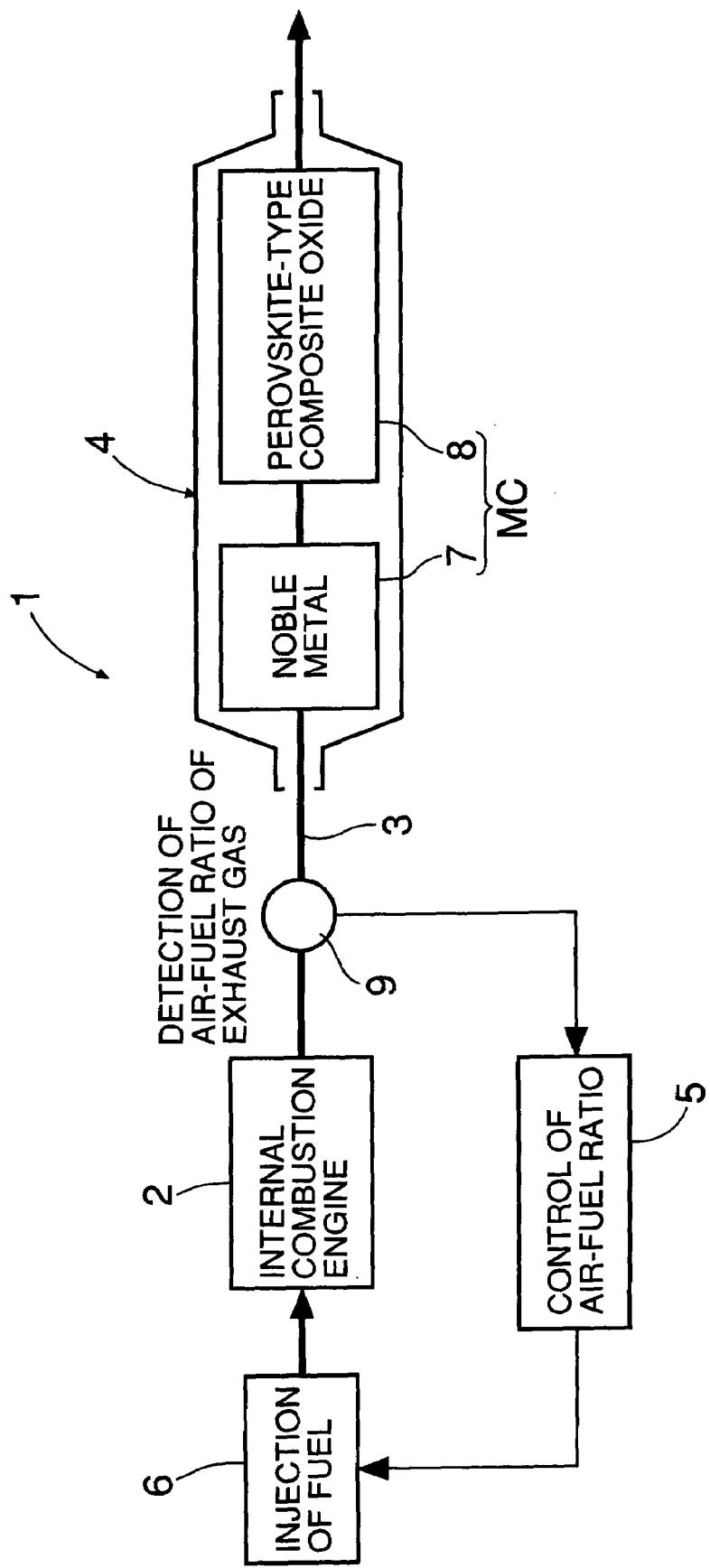
FIG. 1 is a block diagram of a first embodiment.

In the first embodiment shown in FIG. 1, an exhaust emission control system 1 includes an exhaust gas purification device 4 disposed in an exhaust pipe 3 of an internal combustion engine 2, and an air-fuel ratio control device 5 for controlling the air-fuel ratio (A/F) of an air/fuel mixture supplied to the internal combustion engine 2. A fuel injection device 6 injects into the internal combustion engine 2 an amount of fuel determined based on a control signal from the air-fuel ratio control device 5.

The exhaust gas purification device 4 comprises a monolith catalyst MC that includes an oxygen storage agent (OSC agent) and a noble metal-based three-way catalyst comprising Pd, Rh, and Pt disposed at an upstream location in the exhaust gas flow, that is, the exhaust pipe 3, and that includes a perovskite-type double oxide having three-way catalytic function disposed at a downstream location in the exhaust gas flow, that is, the exhaust pipe 3. With regard to this monolith catalyst MC, the amount C1 of Pd carried is 0.97 g/L$\leq$C1$\leq$1.68 g/L, the amount C2 of Rh carried is 0.11 g/L$\leq$C2$\leq$0.2 g/L, the amount C3 of Pt carried is 0.06 g/L$\leq$C3$\leq$0.11 g/L, the amount C4 of the oxygen storage agent carried is 25 g/L$\leq$C4$\leq$75 g/L, and the amount C5 of the perovskite-type double oxide carried is 5 g/L$\leq$C5$\leq$15 g/L. The noble metal-based three-way catalyst and the oxygen storage agent are present in a first catalyst section 7 of the monolith catalyst MC, and the perovskite-type double oxide is present in a second catalyst section 8 of the monolith catalyst MC.

In the exhaust pipe 3, an air-fuel ratio sensor (an $O_2$ sensor) 9 is disposed at a location upstream of the exhaust gas purification device 4, and the air-fuel ratio sensor 9 detects, in terms of an oxygen concentration, an air-fuel ratio of the exhaust gas discharged from the internal combustion engine 2 and introduced into the exhaust gas purification device 4, and thus, an air-fuel ratio of the air/fuel mixture supplied to the internal combustion engine 2. The air-fuel ratio control device 5 controls the air-fuel ratio of the air/fuel mixture supplied to the internal combustion engine 2, based on a signal from the air-fuel ratio sensor 9, so that the air-fuel ratio of the exhaust gas in the exhaust pipe 3 at a location upstream of the exhaust gas purification device 4, that is, at a location upstream of the first catalyst section 7, is equal to a theoretical air-fuel ratio (A/F=14.7).

In the above-mentioned arrangement, when the air-fuel ratio of the air/fuel mixture supplied to the internal combustion engine 2 is detected by the air-fuel ratio sensor 9, the detection signal is fed back to the air-fuel ratio control device 5. In the air-fuel ratio control device 5, an amount of fuel to be injected is calculated, based on the detection signal, so that a target air-fuel ratio is obtained, that is, the air-fuel ratio of the exhaust gas at a location upstream of the exhaust gas purification device 4 is equal to the theoretical air-fuel ratio, and such an amount of fuel is injected from the fuel injection device 6 into the internal combustion engine 2.

When the air-fuel ratio of the exhaust gas from the internal combustion engine 2 is controlled so as to become equal to the theoretical air-fuel ratio, although the air-fuel ratio of the exhaust gas at the inlet of a purification region that includes the noble metal-based three-way catalyst, that is, the first catalyst section 7, has a relatively large variation due to various external factors and the like, since the noble metal-based three-way catalyst has a wide A/F Window, in spite of the variation it can exhibit an exhaust emission control capability. At the same time, the oxygen storage agent exhibits an oxygen storage effect and the air-fuel ratio of the exhaust gas at the outlet of the first catalyst section 7 is thus made to converge to a substantially straight line so as to minimize the variation.

Although the A/F Window of the perovskite-type double oxide of the second catalyst section 8 is considerably narrower than that of the noble metal-based three-way catalyst, the air-fuel ratio of the exhaust gas can be contained within the narrow A/F Window by the oxygen storage agent exhibiting an effect in converging the air-fuel ratio of the exhaust gas, thus allowing the perovskite-type double oxide to exhibit an excellent exhaust emission control capability.

The perovskite-type double oxide having the three-way catalytic function has A-site defects in its crystal structure, and it is conceivable that the A-site defects are involved in purification of the exhaust gas. That is, NOx in the exhaust gas is adsorbed on the A-site defects, the O atom thereof enters the A-site defect, the bonding state of the NOx thereby becomes electronically unstable, and the bond between the O atom and the N atom is broken. The N atom is reduced to become $N_2$, and the O atom remaining in the A-site defect adsorbs HC, CO, and $H_2$ in the exhaust gas and leaves the A-site defect, thus regenerating the A-site defect and at the same time oxidizing the HC, CO, and $H_2$ into $H_2O$ and $CO_2$.

Pd, Rh, and Pt can exhibit an exhaust emission control capability even in a state in which the exhaust gas temperature is low when the internal combustion engine is started and the perovskite-type double oxide is not yet activated. Furthermore, when the exhaust gas flow rate is high (high SV), the perovskite-type double oxide tends to have a low NOx control capability, but this can be compensated for by Rh and Pt.

With regard to the oxygen storage agent, a known compound such as CeZrO or $CeO_2$ is used.

With regard to a perovskite-type double oxide containing a lanthanide mixture extracted from bastnaesite, it may be one represented by the general formula $A_{a-x}B_xMO_b$, wherein A is the lanthanide mixture extracted from the bastnaesite; B is a bivalent or monovalent cation; M is at least one element selected from the group consisting of elements having atomic numbers of 22 to 30, 40 to 51 and 73 to 80; a is 1 or 2, b is 3 when a is 1, or 4 when a is 2; and x is in the range of $0 \leq x < 0.7$.

The perovskite-type double oxides include, for example, $Ln_{0.6}Ca_{0.4}CoO_3$ (Ln is a lanthanoid and includes La, Ce, Pr, Nd or the like, and hereinafter referred to likewise), $Ln_{0.83}Sr_{0.17}MnO_3$, $Ln_{0.7}Sr_{0.3}CrO_3$, $Ln_{0.6}Ca_{0.4}Fe_{0.8}Mn_{0.2}O_3$, $Ln_{0.8}Sr_{0.2}Mn_{0.9}Ni_{0.04}Ru_{0.06}O_3$, $Ln_{0.8}K_{0.2}Mn_{0.95}Ru_{0.05}O_3$, $Ln_{0.7}Sr_{0.3}Cr_{0.95}Ru_{0.05}O_3$, $LnNiO_3$, $Ln_2(Cu_{0.6}Co_{0.2}Ni_{0.2})O_4$, $Ln_{0.8}K_{0.2}Mn_{0.95}Ru_{0.05}O_3$ and the like.

Such perovskite-type double oxides are disclosed in the specification and drawings of International Application Laid-open No. WO 97/37760. Any of the perovskite-type double oxides disclosed in this International Application can be used in the present invention. Such an air-fuel control device 5 as described above is disclosed in Japanese Patent Application Laid-open No. 60-1342 filed by the present applicant, and an electronic control unit 5 disclosed in this publication is used in the embodiments of the present invention.

Specific examples are explained below.

[I] An exhaust emission control device used in a 1999 type Accord automobile, manufactured by Honda Giken Kogyo Kabushiki Kaisha, was prepared as a noble metal-containing conventional catalyst section, which corresponds to the first catalyst section 7, and in which Pd, Rh, and CeZrO were carried on $\gamma$-$Al_2O_3$, and this was retained on a 0.7 L honeycomb support. In this case, the amount C1 of Pd carried was 2.02 g/L, the amount C2 of Rh carried was 0.1 g/L, and the amount C4 of CeZrO carried was 50 g/L.

Prepared as the second catalyst section 8 was one in which the perovskite-type double oxide $Ln_{0.83}Sr_{0.17}MnO_3$, produced according to Example 5 in the specification of International Application Laid-open No. WO97/37760, was retained on a 0.7 L honeycomb support. In this case, the amount C5 of perovskite-type double oxide carried was 7.8 g/L.

[II] The conventional catalyst section was incorporated in an exhaust pipe of a 1.6 L gasoline internal combustion engine, and an exhaust emission control bench test was carried out. An air-fuel ratio sensor was disposed in the exhaust pipe at a location upstream of the conventional catalyst section, as in FIG. 1. Another exhaust emission control bench test was carried out in a similar manner for the second catalyst section 8.

Figure 2:
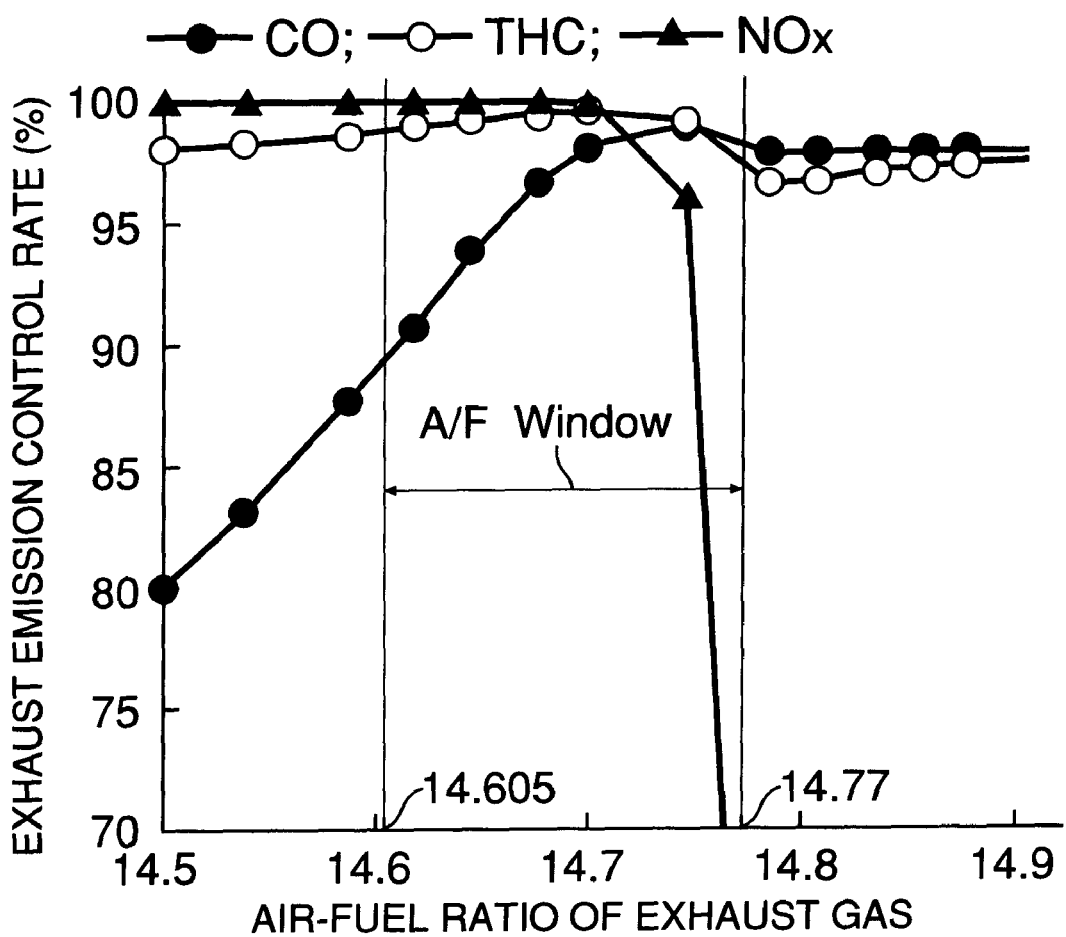
FIG. 2 is a graph showing the relationship between the air-fuel ratio of an exhaust gas and the exhaust emission control rate provided by a noble metal-based three-way catalyst.
Figure 3:
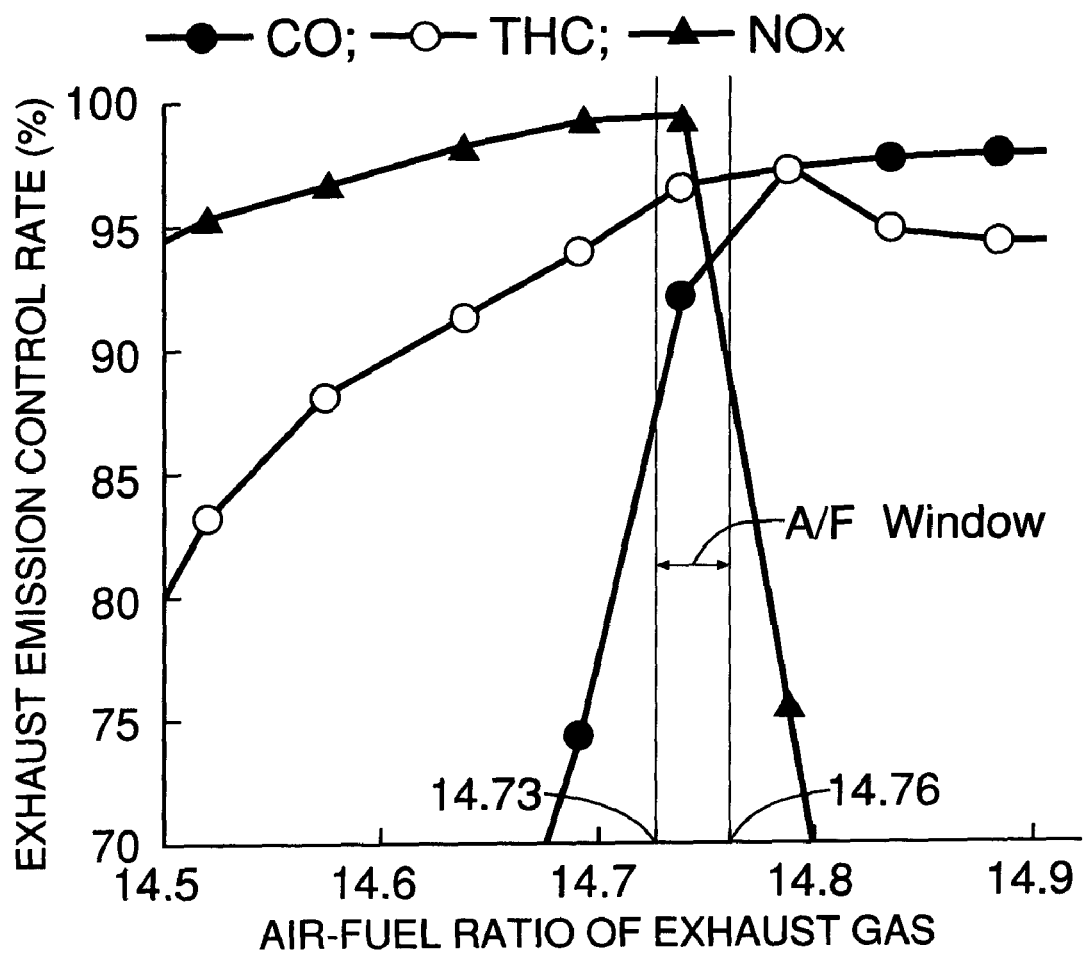
FIG. 3 is a graph showing the relationship between the air-fuel ratio of an exhaust gas and the exhaust emission control rate provided by a perovskite-type double oxide.

FIG. 2 shows the relationship between the air-fuel ratio of an exhaust gas and the exhaust emission control rate for the conventional catalyst section, and FIG. 3 shows the relationship between the air-fuel ratio of an exhaust gas and the exhaust emission control rate for the second catalyst section 8 (theoretical air-fuel ratio A/F=14.7). When FIGS. 2 and 3 are compared with each other, the A/F Window in the perovskite-type double oxide in the second catalyst section 8 is narrower than that of the noble metal-based three-way catalyst in the conventional catalyst section, and is about 18% of that of the noble metal-based three-way catalyst.

Next, the conventional catalyst section was incorporated in an exhaust pipe of an automobile having a 1.6 L gasoline engine mounted therein, and first and second air-fuel ratio sensors were disposed in the exhaust pipe at locations upstream and downstream of the conventional catalyst section. Changes in the air-fuel ratio were measured with the passage of time at the inlet and the outlet of the conventional catalyst section. The detection signal from the second air-fuel ratio sensor disposed at the downstream location was used to correct the amount of fuel to be injected, which was calculated based on a result of the detection by the first air-fuel ratio sensor.

Figure 4:
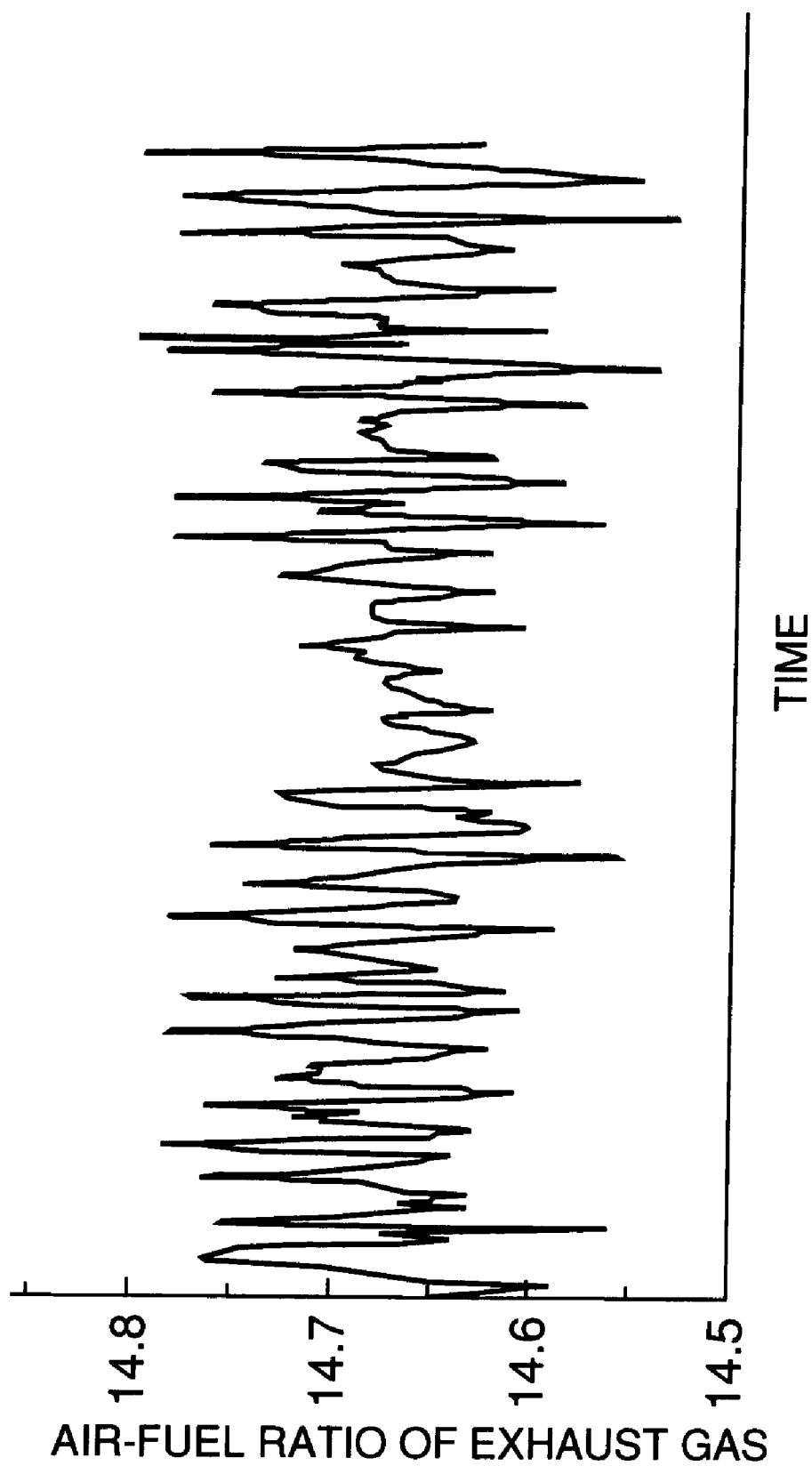
FIG. 4 is a graph showing changes in the air-fuel ratio of exhaust gas at the inlet of a conventional catalyst section with the passage of time.

FIG. 4 shows changes in the air-fuel ratio of exhaust gas at the inlet of the conventional catalyst section with the passage of time. It can be seen from FIG. 4 that a relatively large variation was generated in the air-fuel ratio of exhaust gas at the inlet, as described above.

Figure 5:
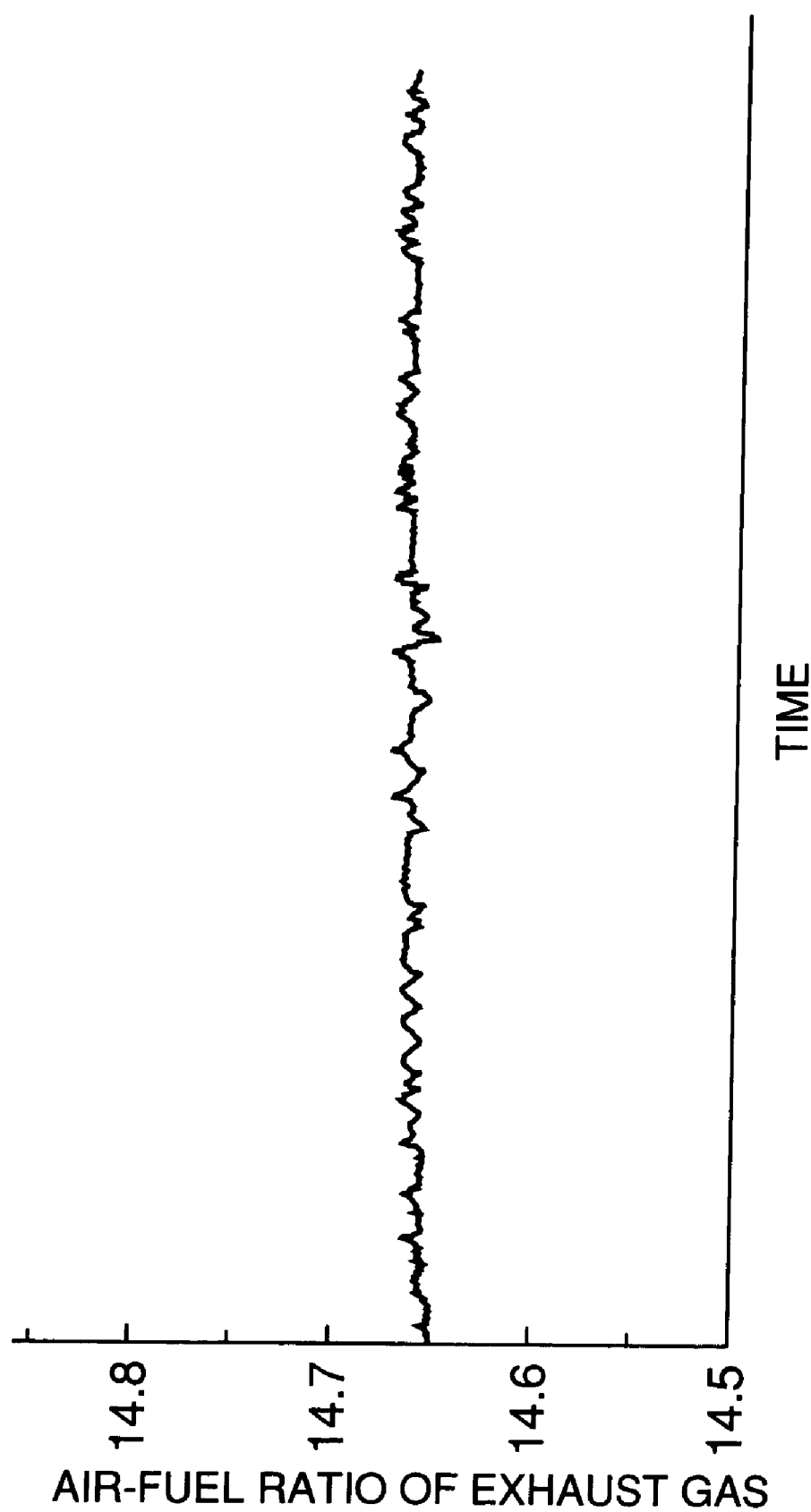
FIG. 5 is a graph showing changes in the air-fuel ratio of exhaust gas at the outlet of the conventional catalyst section with the passage of time.

FIG. 5 shows changes in the air-fuel ratio of exhaust gas at the outlet of the conventional catalyst section with the passage of time. It can be seen from FIG. 5 that the air-fuel ratio of exhaust gas at the outlet was made to converge to a substantially straight line, as described above, by the oxygen storage effect of CeZrO.

If the air-fuel ratio converged in the above manner is contained within the A/F Window of the perovskite-type double oxide shown in FIG. 3, then the second catalyst section 8 can exhibit a high exhaust emission control rate.

For this reason, a first catalyst section 7 was prepared in which Pt, Pd, Rh, and CeZrO were carried on $\gamma$-$Al_2O_3$, and this was retained on a 0.7 L honeycomb support. In this case, the amount C1 of Pd carried was 0.97 g/L, the amount C2 of Rh carried was 0.11 g/L, the amount C3 of Pt carried was 0.06 g/L, and the amount C4 of CeZrO carried was 50 g/L. This first catalyst section 7 was subjected to an actual automobile test in the same manner as above to measure changes in the air-fuel ratio of exhaust gas at the outlet of the first catalyst section 7 with the passage of time.

Figure 6:
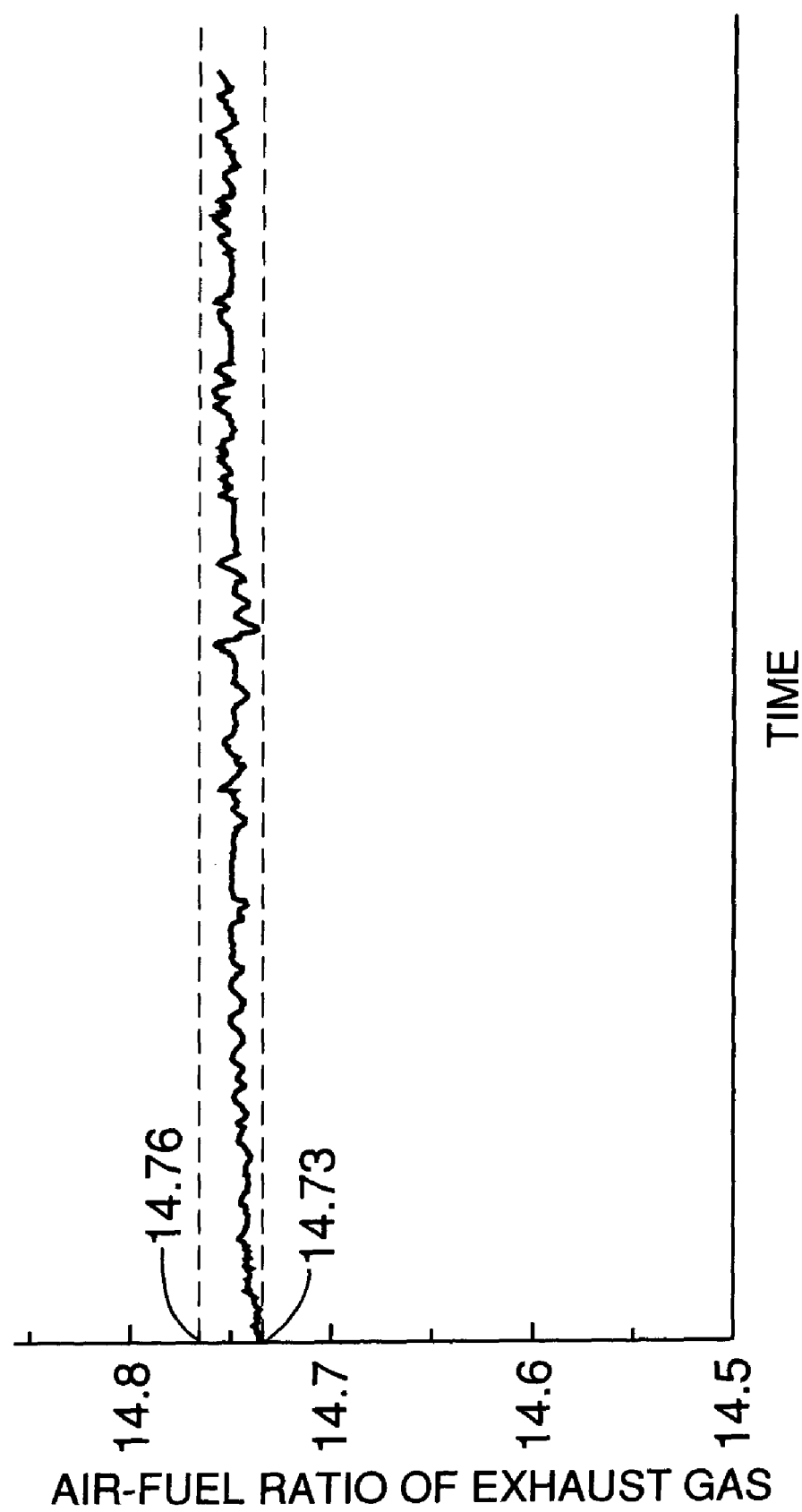
FIG. 6 is a graph showing changes in the air-fuel ratio of exhaust gas at the outlet of a first catalyst section with the passage of time.

FIG. 6 shows changes in the air-fuel ratio of exhaust gas at the outlet of the first catalyst section 7 with the passage of time. As is clear from FIG. 6, the air-fuel ratio of exhaust gas at the outlet was made to converge to a substantially straight line, as described above, by the oxygen storage effect of CeZrO. Moreover, it was ascertained that the converged air-fuel ratio of the exhaust gas was contained within the A/F Window of the perovskite-type double oxide shown in FIG. 3, i.e., $14.73 \leq A/F \leq 14.76$.

Next, four types of first catalyst sections 7 were prepared by changing the amounts of Pd, Rh, and Pt carried, and four types of second catalyst sections 8 were prepared by changing the amount of perovskite-type double oxide ($Ln_{0.83}Sr_{0.17}MnO_3$) of the same type as above. Monolith catalysts MC of Examples 1 to 3 and a Comparative Example were then prepared by combining the first and second catalyst sections 7, 8. TABLE 1 shows the structures of Examples 1 to 3 and the Comparative Example. The structure of the conventional catalyst section is also given in TABLE 1 for reference.

TABLE 1

| Monolith catalyst | First catalyst section (g/L) | | | | Second catalyst section (g/L) |
|---|---|---|---|---|---|
| | Pd | Rh | Pt | CeZrO | |
| Example 1 | 0.97 | 0.11 | 0.06 | 50 | 7.8 |
| Example 2 | 1.45 | 0.17 | 0.10 | 50 | 11.7 |
| Example 3 | 1.68 | 0.20 | 0.11 | 50 | 13.6 |
| Comparative Example | 2.02 | 0.21 | 0.11 | 50 | 13.6 |
| Conventional catalyst section | 2.02 | 0.10 | — | 50 | — |

Next, the catalyst sections of Examples 1 to 3 and the like were incorporated into an exhaust pipe of a 2 L gasoline engine, and an exhaust emission control bench test was carried out to measure an exhaust emission control rate. The results are given in TABLE 2.

TABLE 2

| Monolith catalyst | Exhaust emission control rate (%) | | |
|---|---|---|---|
| | CO | HC | NOx |
| Example 1 | 96.5 | 97.6 | 98.6 |
| Example 2 | 97.7 | 99.0 | 99.5 |
| Example 3 | 98.1 | 98.8 | 99.4 |
| Comparative Example | 99.2 | 98.4 | 99.5 |
| Conventional catalyst section | 93.7 | 95.8 | 97.2 |

Figure 7:
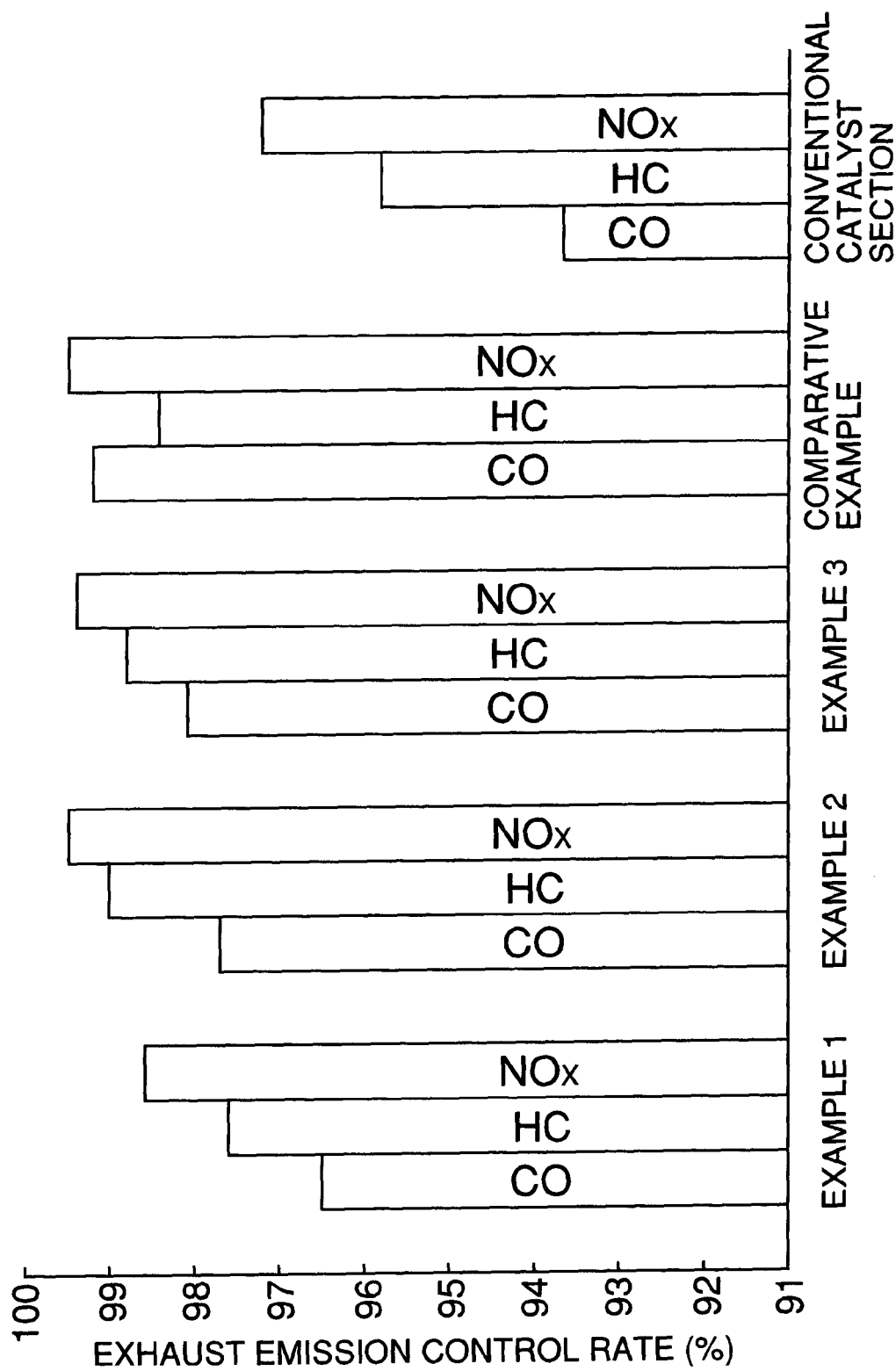
FIG. 7 is a graph showing an exhaust emission control rate.

FIG. 7 is a graph showing the exhaust emission control rate of Examples 1 to 3 and the like, based on the results shown in TABLE 2. As is clear from TABLE 2 and FIG. 7, Examples 1 to 3 showed excellent exhaust emission control rates compared with the conventional catalyst section having no second catalyst section 8 and, moreover, the amount of Pd was less by about 17% to about 52%. The exhaust emission control rates of Examples 1 to 3 were close to that of the Comparative Example and, moreover, the amount of Pd was less than that of the Comparative Example by about 17%.

Figure 8:
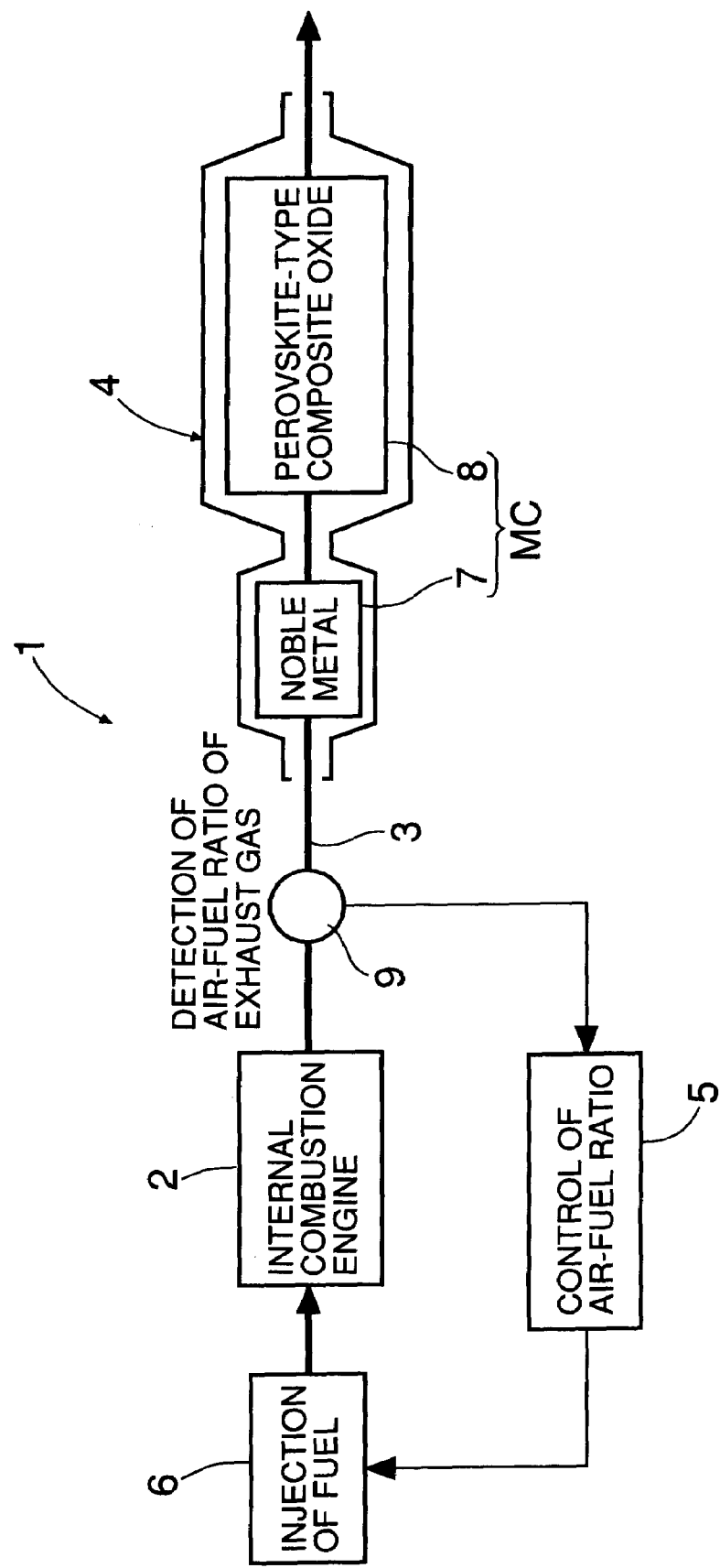
FIG. 8 is a block diagram of a second embodiment.

FIG. 8 shows a second embodiment. In this exhaust emission control system, a first catalyst section 7 is used mainly to regulate the air-fuel ratio of exhaust gas that is to be introduced into a second catalyst section 8. Purification of the exhaust gas is carried out mainly by the second catalyst section 8. In this case, the first catalyst section 7 can be constructed at a small size, whereby the amount of noble metal-based three-way catalyst used can be decreased.

Figure 9:
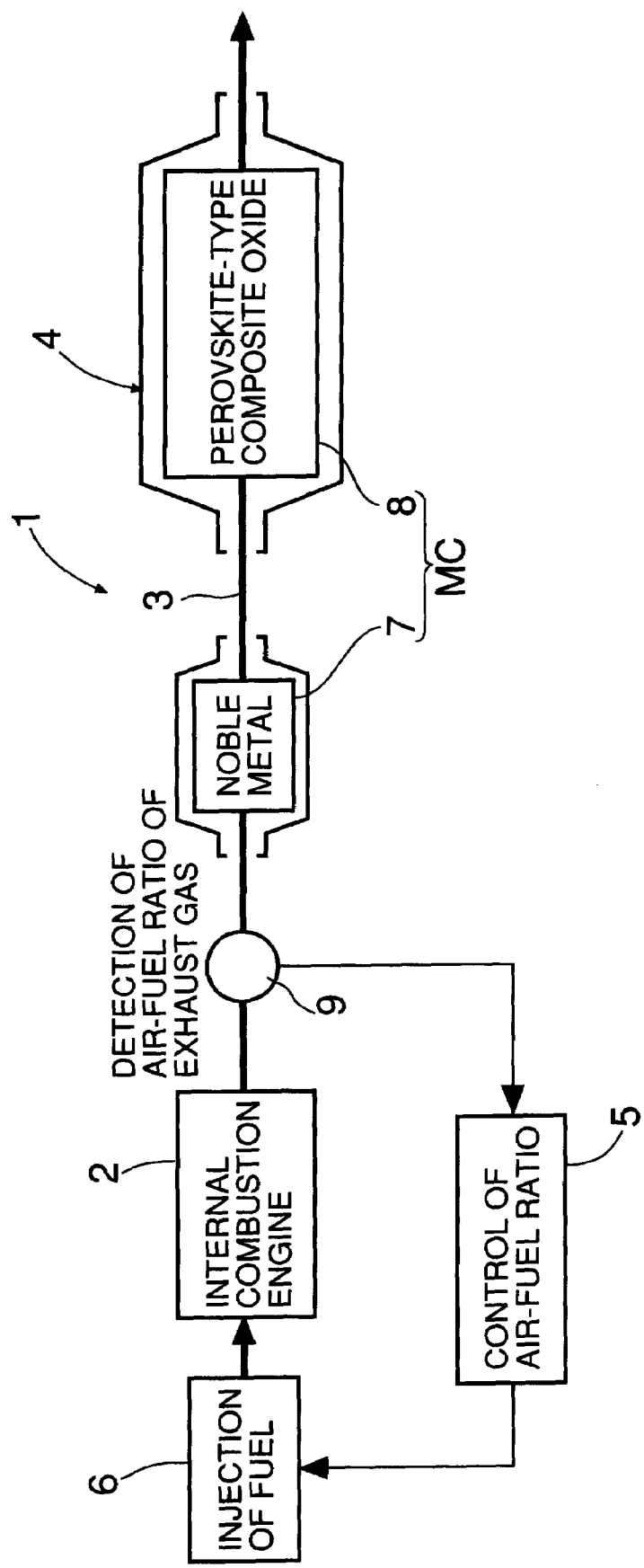
FIG. 9 is a block diagram of a third embodiment.

FIG. 9 shows a third embodiment. In this exhaust emission control system, a first catalyst section 7 is constructed at a small size and disposed in an exhaust pipe 3 at a location immediately downstream of an internal combustion engine 2. With this construction, the first catalyst section 7 is activated soon after starting the engine and exhibits an exhaust emission control capability. After the engine is warmed up, the first catalyst section 7 is used to regulate the air-fuel ratio of exhaust gas that is to be introduced into a second catalyst section 8, and purification of the exhaust gas is thus conducted solely by the second catalyst section 8.

It is also possible to separate the Pd, Rh, and Pt such that Pd is disposed at a location upstream in the exhaust gas flow and Rh and Pt are disposed at a location downstream therein. In order to widen the A/F Window of the perovskite-type double oxide even to a slight extent, adding a small amount of a noble metal such as Pd, Rh, or Pt to the above mentioned double oxide is effective.

What is claimed is:

1. An exhaust emission control system for an internal combustion engine, the system comprising a monolith catalyst (MC) that comprises an oxygen storage agent and a noble metal-based three-way catalyst comprising Pd, Rh, and Pt disposed at an upstream location in the exhaust gas flow in the internal combustion engine (2), and a catalyst comprising a perovskite-type double oxide having a three-way catalytic function disposed at a downstream location in the exhaust gas flow, an amount C1 of said Pd being 0.97 g/L $\leq$ C1 $\leq$ 1.68 g/L, an amount C2 of said Rh being 0.11 g/L $\leq$ C2 $\leq$ 0.2 g/L, an amount C3 of said Pt being 0.06 g/L $\leq$ C3 $\leq$ 0.11 g/L, an amount C4 of said oxygen storage agent being 25 g/L $\leq$ C4 $\leq$ 75 g/L, and an amount C5 of said perovskite-type double oxide being 5 g/L $\leq$ C5 $\leq$ 15 g/L.

2. An exhaust emission control system for an internal combustion engine, the system comprising a monolith catalyst (MC) that comprises a noble metal-based three-way catalyst disposed at an upstream location in the exhaust gas flow in the internal combustion engine (2), and a perovskite-type double oxide having three-way catalytic function disposed at a downstream location in the exhaust gas flow, wherein an oxygen storage agent is disposed together with the noble metal-based three-way catalyst, and an amount C4 of said oxygen storage agent is 25 g/L $\leq$ C4 $\leq$ 75 g/L.

3. An exhaust emission control system for an internal combustion engine, the system comprising a first catalyst section (7) comprising a noble metal-based three-way catalyst containing noble metals in the range of 1.14–1.99 g/L and an oxygen storage agent disposed at an upstream location in the exhaust gas flow in the internal combustion engine (2), and a second catalyst section (8) comprising a perovskite-type double oxide having a three-way catalytic function disposed at a downstream location in the exhaust gas flow, the oxygen storage agent having a function of regulating the air-fuel ratio of an exhaust gas that is to be introduced into the second catalyst section (8) so as to fall within an A/F Window of the perovskite-type double oxide.

4. The exhaust emission control system for an internal combustion engine according to claim 1, 2 or 3, wherein the perovskite-type double oxide includes a lanthanide mixture extracted from bastnaesite.

* * * * *